United States Patent
Murakami et al.

(10) Patent No.: US 7,953,154 B2
(45) Date of Patent: May 31, 2011

(54) IMAGE CODING DEVICE AND IMAGE CODING METHOD

(75) Inventors: Tomokazu Murakami, Kokubunji (JP); Isao Karube, Yokohama (JP); Hiroaki Ito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1486 days.

(21) Appl. No.: 11/367,569

(22) Filed: Mar. 6, 2006

(65) Prior Publication Data
US 2006/0251171 A1 Nov. 9, 2006

(30) Foreign Application Priority Data
May 6, 2005 (JP) ................................. 2005-134734

(51) Int. Cl.
*H04N 7/12* (2006.01)
*H04N 11/02* (2006.01)

(52) U.S. Cl. .......... 375/240.16; 375/240.24; 375/240.18

(58) Field of Classification Search ............. 375/240.16, 375/240.24, 240.18, 240.12, 240.01, 240
See application file for complete search history.

(56) References Cited

U.S. PATENT DOCUMENTS
| | | | |
|---|---|---|---|
| 2002/0025001 A1* | 2/2002 | Ismaeil et al. | 375/240.16 |
| 2005/0129112 A1* | 6/2005 | Ichihashi et al. | 375/240.03 |
| 2006/0188168 A1* | 8/2006 | Sheraizin et al. | 382/254 |

FOREIGN PATENT DOCUMENTS
| | | |
|---|---|---|
| JP | 10-336664 | 12/1998 |
| JP | 11-215503 | 8/1999 |

OTHER PUBLICATIONS

T. Koga et al., "Motion Compensated Inter-Frame Coding for Video-Conferencing" Proc. NTC81 (Nov. 1981).
L.M. Po et al., "A Novel Four-Step Search Algorithm for Fast Block Motion Estimation", IEEE Trans. Circuits System, Video Technology (Jun. 1996).

\* cited by examiner

*Primary Examiner* — David C. Payne
*Assistant Examiner* — Brian J Stevens
(74) *Attorney, Agent, or Firm* — Antonelli, Terry, Stout & Kraus, LLP.

(57) ABSTRACT

In the motion search in the inter-frame prediction coding, parameters necessary for the motion search, such as sample-point spacing and sample-point number in the step search, are controlled using a unit for calculating the complexity of an image and a unit for estimating the movement amount of the image. This configuration makes it possible to provide the scheme for searching for the high-speed and high-accuracy motion vector, and the image coding device for performing this motion search.

2 Claims, 3 Drawing Sheets

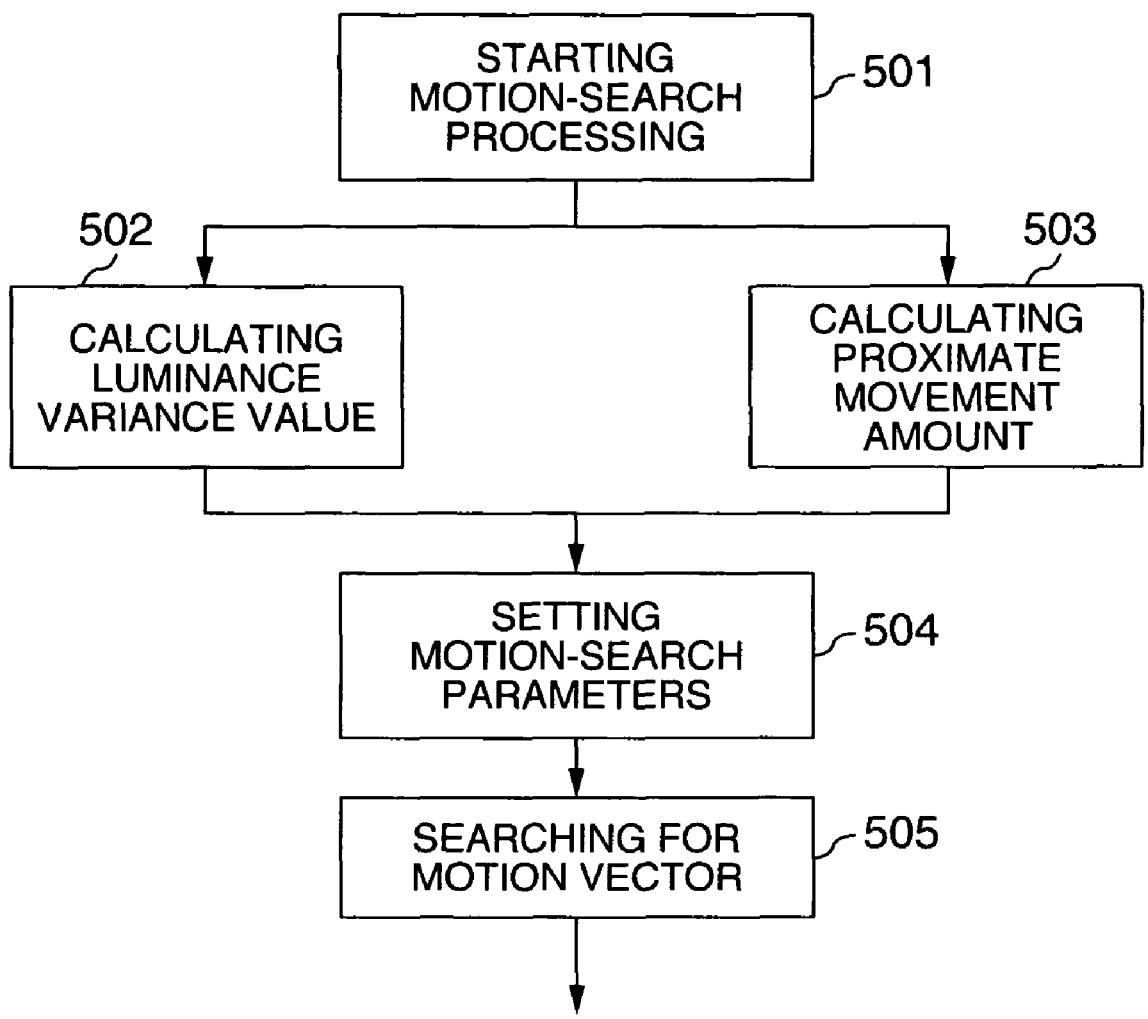

IMAGE CODING DEVICE AND IMAGE CODING METHOD

INCORPORATION BY REFERENCE

The present application claims priority from Japanese application JP2005-134734 filed on May 6, 2005, the content of which is hereby incorporated by reference into this application.

BACKGROUND OF THE INVENTION

1. Field of the Invention

The present invention relates to an image coding device and an image coding method for coding images. More particularly, it relates to such appliances as image record device, player, mobile telephone, and digital camera using these device and method.

2. Description of the Related Art

As methodological technique for recording and transmitting large capacity of image and voice information in such-a manner that the image and voice information are coded into digital data, coding schemes such as MPEG (: Moving Picture Experts Group) have been defined and established. MPEG has already become the coding scheme of international standard as MPEG-1 Standard, MPEG-2 Standard, and MPEG-4 Standard. Also, as scheme for enhancing compression ratio, schemes such as H. 264/AVC (: Advanced Video Coding) are defined. These schemes have been employed as coding schemes in such equipments and appliances as digital satellite broadcast, DVD, mobile telephone, and digital camera. At present, these schemes are coming into wider and wider range in use, and are becoming increasingly close and familiar to the general public.

In the image coding schemes like this, prediction coding among frames plays an important and significant role in enhancing the compression ratio. This inter-frame prediction coding is the following scheme: A coding-target frame is coded by predicting this coding-target frame from an already-coded reference frame. In the above-described standards such as MPEG and H. 264, the inter-frame prediction coding is implemented by making motion prediction in the unit of a constant-sized block which is referred to as "macro block". This motion prediction is the following scheme: The coding-target macro block is superimposed on the reference frame within a constant motion search range, and then, a position which leads to the best compression efficiency is searched for as a motion vector. In the inter-frame prediction coding, the motion vector searched for by the motion prediction, and a difference between the coding-target macro block and the reference frame when this motion vector is applied thereto, will be coded and transmitted.

As concrete schemes for carrying out the motion prediction, there exist full-search method which will make the search within the whole of a predetermined motion search range, and high-speed search method which will make the search within the predetermined motion search range sparsely in a step-by-step manner. The full-search method will check all of the vectors which are to become candidates. This characteristic makes it possible to select the motion vector which leads to the best compression efficiency, but results in a problem that the processing throughput becomes enormous. Meanwhile, the high-speed search method is the scheme which will check the candidate vectors in a step-by-step manner. This characteristic makes it possible to perform the processing at high speed and with height of the compression efficiency maintained. As the most representative scheme of the high-speed search method, step search method can be mentioned. Examples of the step search method are Three-Step Search (: 3SS) disclosed in T. Koga, K. Iinuma, A. Hirano, Y. Iijima, and T. Ishiguro: "Motion Compensated Inter-Frame Coding for Video-Conferencing", Proc. NTC81 (November 1981), and Four-Step Search (: 4SS) disclosed in L. M. Po and W. C. Ma: "A Novel Four-Step Search Algorithm for Fast Block Motion Estimation", IEEE Trans. Circuits System, Video Technology (June, 1996).

FIG. 2 illustrates an example of 3SS. In this scheme, at first, with respect to candidates for motion vectors at sample points positioned at constant distances from a start point of the search, measurements on the errors are performed. Next, points which respectively lead to the smallest errors are selected, thereby narrowing the sample-point spacings gradually. Finally, a motion vector which results in the smallest error from among the inspected candidate vectors is selected. In FIG. 2, ①, ②, and ③ respectively indicate the positions of the motion vectors measured at the respective steps. Also, the grayed-out numbers respectively indicate the motion vectors selected at the respective steps. As illustrated in FIG. 2, at the first step, the second step, and the third step respectively, the candidate vectors with the small errors are respectively determined while narrowing the sample-point spacings with the candidate vectors selected at the respective steps used as the centers. In many cases, the sample-point spacings at the first step are generally set at an order of the one-half the maximum motion search range.

FIG. 3 illustrates an example of 4SS. In this scheme, at the first step, in much the same way as the case of 3SS, measurements on the errors are performed with respect to candidate vectors at sample points positioned at constant distances from a start point. Next, at the second step and the third step, measurements on the errors of the candidate vectors are performed with respect to three sample points in such a manner as to be extended in outward directions from a selected candidate vector. When no candidate vectors with small errors are found out even if the sample points have been extended in the outward directions, 4SS proceeds to the fourth step. At this step, a motion vector with a small error is searched for with the selected candidate vector used as the center.

The step search method always selects the sample points with the constant sample-point spacings set therebetween. This has resulted in a problem that the method reflects none of movement characteristics of an image and thus brings about a low accuracy. In contrast thereto, as the scheme resulting from improving the step search method, scheme disclosed in JP-A-11-215503 can be mentioned. In the present scheme, technology is described that movement amount in proximity to a coding-target area is measured in the step search method, and that the search range for vector search is changed in response to this movement amount measured.

SUMMARY OF THE INVENTION

The general motion vector high-speed search method as described above has reflected none of the movement characteristics and complexity characteristics of an image. This drawback has resulted in the following problem: Considering that the number of the sample points to be searched for is large, and that the search speed is slow, the accuracy of the motion vector actually searched for is comparatively lower than expected. Namely, the high-speed search method makes the search with the constant sample-point spacings set without taking the complexity of the image into consideration. This drawback has brought about the following state: The sample-points number is smaller than a necessary amount in a complicated portion of the image where the accuracy of the motion vector is required; while, conversely, the samplepoints number is larger than the necessary amount in a portion of the image where the accuracy is not so required. Here, a proposal has been already made concerning a scheme which controls the search range in the step search method by using the movement characteristics alone. This scheme, however, has reflected none of the complexity characteristics of the image, thereby resulting in an accuracy which is not high enough.

In the present invention, in view of the above-described conventional technologies, in the motion search in the interframe prediction coding, parameters necessary for the motion search are controlled using a unit for calculating the complexity of an image and a unit for estimating the movement amount of the image. Accordingly, based on this configuration, an object of the present invention is to provide a scheme for searching for a high-speed and high-accuracy motion vector, and an image coding device for performing this motion search.

In order to accomplish the above-described object, the representative configuration to be disclosed in the present application is as follows: An image coding device for coding a motion image composed of continuous images, the image coding device including an image complexity-degree estimation unit for calculating complexity degree of an image, a proximate movement-amount estimation unit for estimating movement amount between the image and an image prior thereto, and a motion prediction unit for performing motion prediction on the image, wherein the motion prediction unit exerts control over the motion prediction based on an output from the image complexity-degree estimation unit and an output from the proximate movement-amount estimation unit.

According to the present application, it becomes possible to search for the motion vector effectively in response to the respective image characteristics, such as the complexity of an image and the movement vigorousness of the image. This allows implementation of the search for the motion vector which has a higher accuracy. As a result of this higher-accuracy motion vector, it becomes possible to enhance the compression efficiency of the motion image, thereby allowing implementation of the high-performance image coding device.

BRIEF DESCRIPTION OF THE DRAWINGS

These and other features, objects and advantages of the present invention will become more apparent from the following description when taken in conjunction with the accompanying drawings wherein:

FIG. 5 is an explanatory diagram for explaining an embodiment of the motion search method according to the present invention.

DETAILED DESCRIPTION OF THE INVENTION

Hereinafter, based on illustrations, the explanation will be given below concerning embodiments of the present invention.

Figure 1:
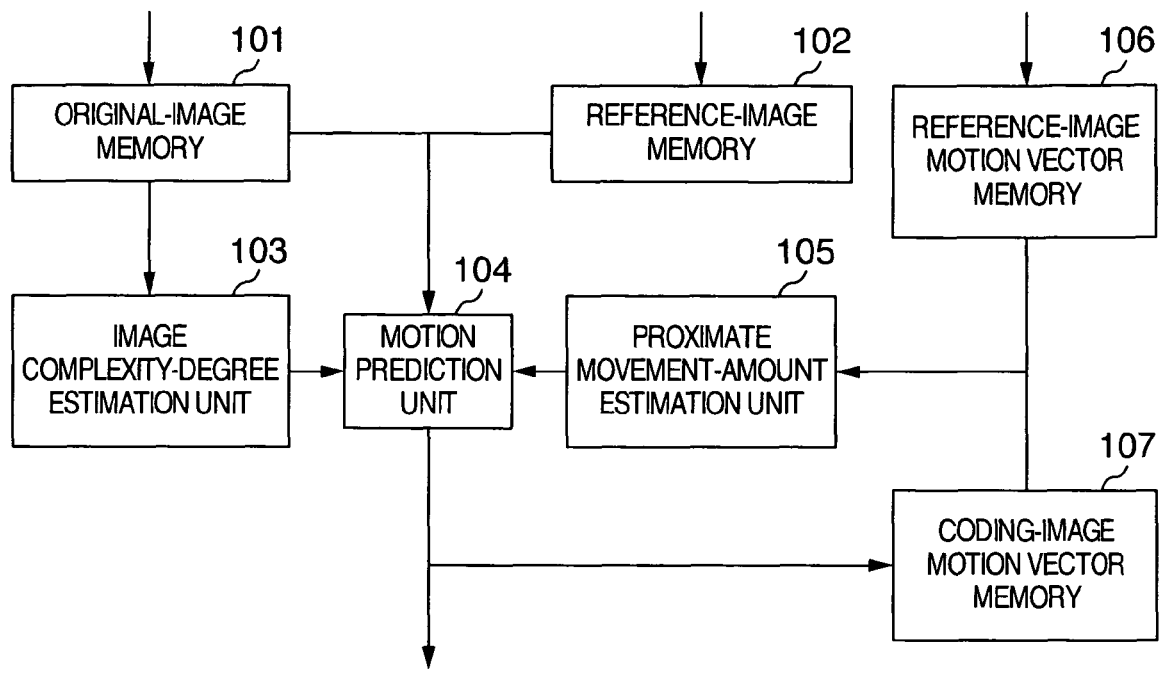
FIG. 1 is an explanatory diagram for explaining an embodiment of the image coding device used in the present invention.
Figure 2:
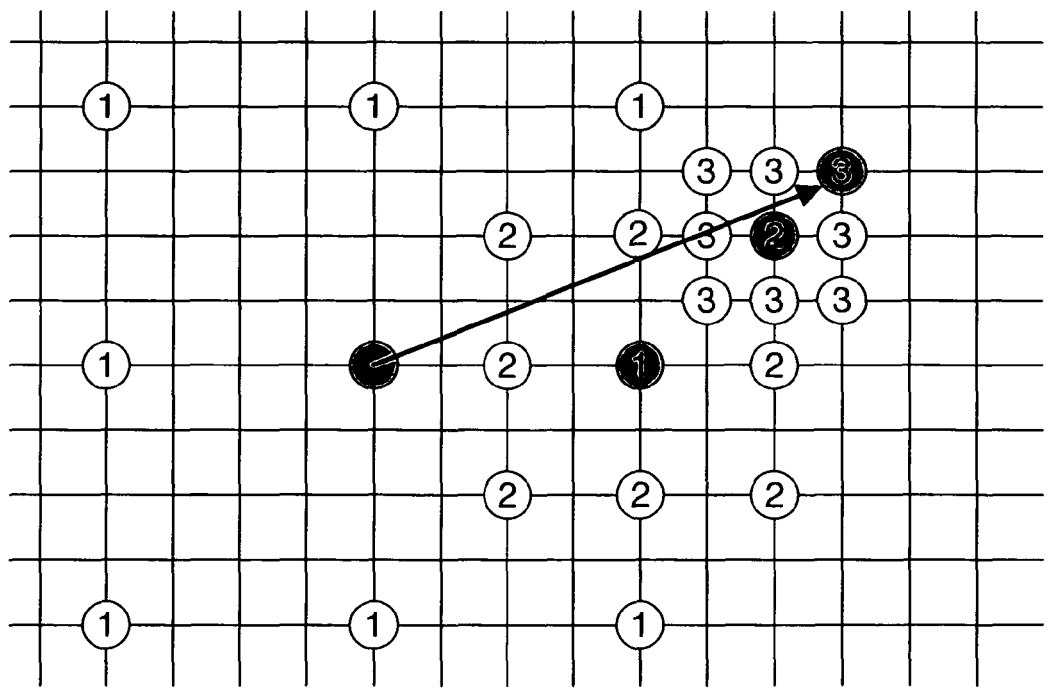
FIG. 2 is the diagram for illustrating one example of the motion search method according to the step search.
Figure 3:
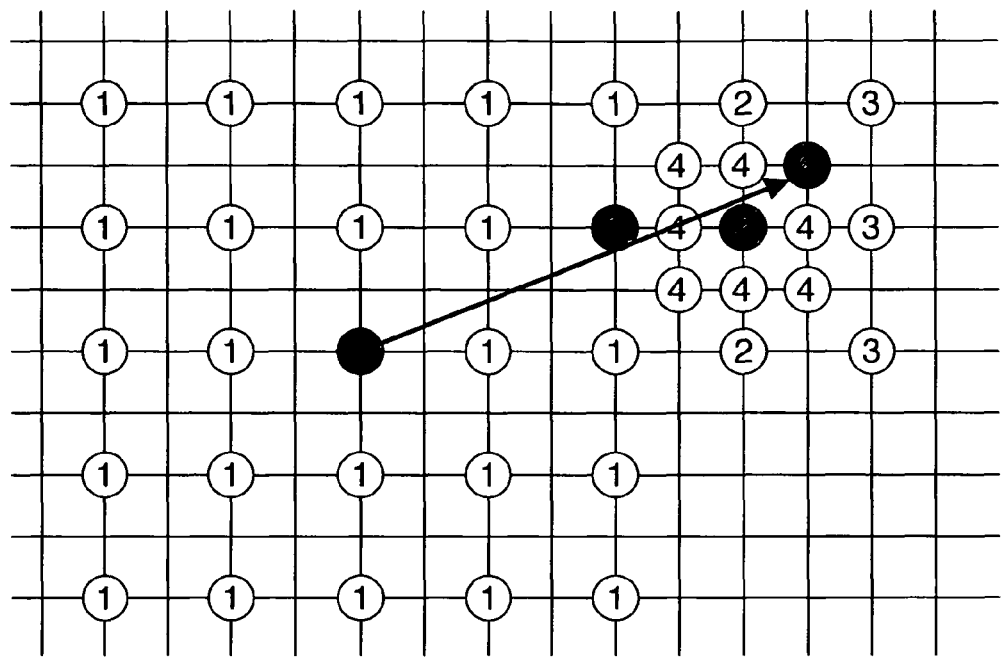
FIG. 3 is the diagram for illustrating another example of the motion search method according to the step search.

FIG. 1 illustrates an embodiment of the image coding device according to the present invention. The explanation will be given below regarding features of this embodiment.

FIG. 1 is the explanatory diagram for explaining a motion search processing part in the image coding device. The configuration components which will mainly perform the motion search are an image complexity-degree estimation unit (103), a motion prediction unit (104), and a proximate movement-amount estimation unit (105). The other configuration components in the processing part are an original-image memory (101), a reference-image memory (102), a reference-image motion vector memory (106), and a coding-image motion vector memory (107).

Taking advantage of an input from the original-image memory (101), the image complexity-degree estimation unit (103) estimates complexity of an image within a frame to be coded. The complexity of an image means magnitude of a signal change within a constant area in the image. The more complicated the image is, the more difficult it becomes to code this image. The complexity of an image can be measured by, e.g., variance of luminance value within a constant area in the image, summation of coefficients other than a DC component acquired when Hadamard transformation is applied to the constant area, and summation of outputs acquired when edge filter is applied to the constant area. Hereinafter, the explanation will be given below concerning an example where motion vectors will be respectively searched for with respect to a block which is composed of 8×8 pixels.

Variance Var of luminance value of the above-described coding-target 8-pixel×8-pixel block can be determined in accordance with the following Expression 1:

$$\mathrm{Var} = \frac{1}{64}\sum_{k=1}^{64}(P_k - \overline{P})^2 \qquad \text{Expression 1}$$

$$\overline{P} = \frac{1}{64}\sum_{k=1}^{64} P_k$$

Here, $P_k$ denotes luminance value of each pixel, and $\overline{P}$ denotes average value of the luminance value of the block. It can be said that the complexity degree is higher as the variance value is larger. Accordingly, the variance value makes it possible to judge the complexity degree. Since calculation load for the variance value is not so large, calculation of the variance value can be processed at high speed. An image signal includes a luminance signal and a color-difference signal. Here, human's sense of vision is sensitive to the luminance, but is somewhat insensitive to the color difference. Consequently, calculating the complexity degree by using the luminance value alone makes it possible to perform the effective calculation while lowering the processing load.

Also, the Hadamard transformation of the coding-target 8-pixel×8-pixel block can be acquired by multiplying the block by the Hadamard matrix from the right side and the left side respectively. Here, the Hadamard matrix is defined by the following Expression 2: Concerning the coefficient matrix acquired as the result of the Hadamard transformation, a coefficient positioned at the uppermost-left is the DC coefficient, and the remaining coefficients are AC coefficients. Regarding the AC coefficients, an AC coefficient positioned at the upper-left has a lower frequency, and an AC coefficient positioned at the lower-right has a higher frequency. It can be said that the complexity degree is higher as the summation of the coefficients is larger. Accordingly, taking the summation of part or the whole of the AC coefficients makes it possible to judge the complexity degree. Distribution of the coefficient matrix acquired after the Hadamard transformation indicates image characteristics on the complexity. This fact allows implementation of detailed controls in response to the pattern. For example, if the frequency in vertical direction is high, the vector search in the vertical direction can be made in particularly enough detail.

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & 1 & 1 & 1 & 1 \\ 1 & -1 & 1 & -1 & -1 & 1 & -1 & 1 \\ 1 & 1 & -1 & -1 & 1 & 1 & -1 & -1 \\ 1 & -1 & -1 & 1 & 1 & -1 & -1 & 1 \end{bmatrix} \quad \text{Expression 2}$$

In the case of using the edge filter, it is preferable to use, e.g., the Sobel operator which is defined by the following Expression 3: In this case, the following calculation is made: Namely, when setting the position of an attention pixel at 0, the peripheral pixels on the periphery are multiplied by the two filter coefficients in Expression 3, then being added to the attention pixel. Moreover, this processing is performed all over the entire coding-target block. This makes it possible to acquire power at edges of each pixel. The complexity degree is higher as the power at the edges is larger. Accordingly, using the power at the edges makes it -possible to judge the complexity degree. The use of the edge filter allows the complexity degree to be calculated in such a manner that largeness of the edges in number is used as the criterion. As a result, the edge filter proves particularly effective in such images as high-contrast image and animation.

$$\begin{bmatrix} -1 & & 1 \\ -2 & 0 & 2 \\ -1 & & 1 \end{bmatrix} \begin{bmatrix} -1 & -2 & -1 \\ & 0 & \\ 1 & 2 & 1 \end{bmatrix} \quad \text{Expression 3}$$

Taking advantage of inputs from the reference-image motion vector memory (106) and the coding-image motion vector memory (107), the proximate movement-amount estimation unit (105) estimates movement amount of the coding-target block, i.e., to what extent the target being screened on has moved from the frames prior and subsequent thereto. For example, within the frame, from motion vectors already determined in a block positioned on the upper side of the coding-target block, a block positioned on the left side thereof, and a block positioned on the upper-right side thereof, medians are taken for the elements in the transverse direction and the longitudinal direction, respectively. This processing makes it possible to acquire a prediction vector of the coding-target block. Then, length of this prediction vector is defined as the movement amount. Also, in the case of using the reference-image motion vectors, a motion vector positioned at the same position on the screen as the coding-target block in the reference image is defined as the prediction vector. Then, length of this prediction vector is defined as the movement amount. The movement amount may also be calculated using both of the prediction vector acquired from the coding image and the prediction vector acquired from the reference image. Since calculation load for the prediction vector is light, calculation of the prediction vector can be processed at high speed. Estimation accuracy for the movement amount exhibits a tendency of becoming higher when the motion vectors of the proximate blocks in the coding image are used than when the motion vectors of the reference image are used in a general manner. The reason for this is as follows: When considering the case where a somewhat large physical object on the screen is going to displace, in some cases, the movement changes in comparison with the prior frame. As far as the range within the screen is concerned, however, the adjacent block group including this physical object can be considered to have substantially the same motion vectors. Also, prior to the coding, approximate motion prediction is made between the reference image and the original image with respect to the entire screen or several areas into which the screen is divided. Then, this motion prediction may be used as the prediction vector of the block.

Taking advantage of the original images in the original-image memory (101) and the reference images in the reference-image memory (102), the motion prediction unit (104) makes the motion prediction based on the full-search method or the step search method as is the case with ordinary motion prediction units. The motion prediction unit (104) according to the present invention differs from the ordinary motion prediction units in the following point: Namely, the unit (104) changes and controls the maximum motion search range and the search sample-point spacing in accordance with the inputs from the image complexity-degree estimation unit (103) and the proximate movement-amount estimation unit (105). What is important in particular is to adjust the search accuracy for the motion vector by taking advantage of the image complexity degree. Here, the movement amount is not necessarily taken into consideration. The addition of the movement amount, however, allows execution of the detailed adjustment, thereby making it possible to search for the high-accuracy motion vector with a small processing throughput.

The more complicated the image is, the larger the error becomes which will occur if the motion search is mistaken. Meanwhile, in a location where the image is simple and planar, the error which will occur there does not become so large even if the motion search is mistaken. This situation requires that, in a location where the image is more complicated, the search accuracy for the motion vector be enhanced further. Also, it is desirable that, as the movement amount is larger, the sample-point spacings at the first step in the maximum motion search range or the step search be enlarged further. The reason for this is as follows: In a location where the movement is larger, the motion vector is expected to become larger. Accordingly, the initial search spacings are permitted to be larger, and also the search range needs to be wide enough.

Figure 4:
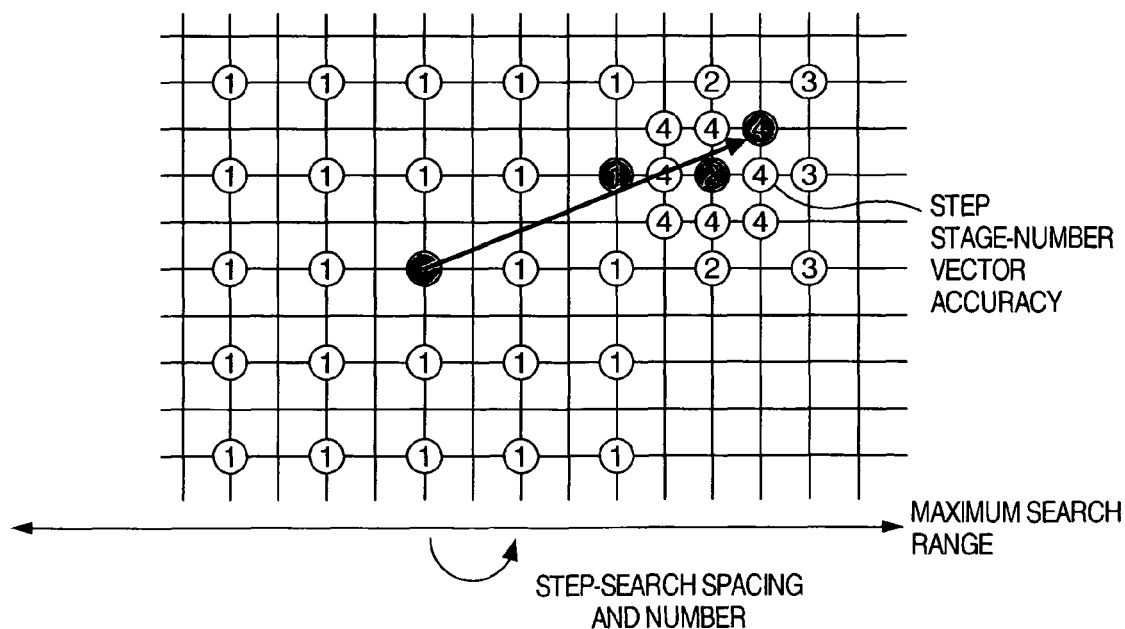
FIG. 4 is an explanatory diagram for explaining an example of motion search parameters according to the present invention.

Hereinafter, referring to FIG. 4, the explanation will be given below concerning the step search method according to the present invention. FIG. 4 illustrates an example of the step search on the basis of 4SS. In this scheme, at the first step, measurements on the errors are performed with respect to candidate vectors at sample points positioned at constant distances from a start point. Next, at the second step and the third step, measurements on the errors of the candidate vectors are performed with respect to three sample points in such a manner as to be extended in outward directions from a selected candidate vector. When no candidate vectors with small errors are found out even if the sample points have been extended in the outward directions, 4SS proceeds to the fourth step. At this step, a motion vector with a small error is searched for with the selected candidate vector used as the center.

Next, the explanation will be given below concerning examples of parameters which are to be controlled in the motion prediction unit (104) in order to make this step search effectively. First of all, the search method itself can be mentioned. In a location where the image is more complicated, a search which is more accurate becomes required. Consequently, if the complexity degree is found to be higher than a certain constant value, the processing is changed so as to make the full search instead of the step search. This change makes it possible to enhance the accuracy of the vector. Furthermore, in the step search, it is also possible to change the sample-point spacing and sample-point number for the search. As the image complexity degree is higher, the sample-point spacing for the step search is made narrower, and the sample-point number therefor is increased further.

Also, in the coding schemes such as H. 264, it is possible to deal with the motion vector with accuracy of integer pixel, one-half pixel, or one-fourth pixel. The processing throughput, however, increases in amount as the accuracy becomes more precise. In view of this situation, the search is made with the integer-pixel accuracy or one-half-pixel accuracy in a location where the complexity degree is lower, whereas the search is made with the one-fourth-pixel accuracy in a location where the complexity degree is higher. This configuration allows the motion search to be performed at high speed and with no lowering in accuracy. The control over the search accuracy is applicable not only to the case of the step search, but also to the case of the full search. This fact makes a contribution to an enhancement in the search speed.

In the present application, in order to perform the motion search with high accuracy and at high speed, the search method is controlled using both the image complexity degree and the estimated movement amount. The present coding scheme is applicable not only to the case of the step search, but also to the case of the full search. Hereinafter, however, the explanation will be given selecting, as an example, the case of the step search which exhibits the more powerful and significant effect. As examples of parameters which take the movement amount into consideration, search start position for the motion search can be mentioned. Usually, the motion search is started at the same position as the coding-target macro block. If, however, the movement amount is found to be large, position of the prediction vector estimated from the proximate blocks is defined as the start position. This allows execution of the higher-accuracy vector search. The following method may also be used: An error is calculated which occurs when the motion prediction is at first made regarding both of the coding-target macro block position and the prediction vector position. Then, the search is started from the smaller position. Next, maximum search range for the motion search can be mentioned. The control is performed so that the range to be searched for will be extended further as the movement amount is larger. This allows acquisition of the higher-precision motion vector. Also, if the estimated movement amount is large, the sample-point spacing for the step search is enlarged. Also, it is possible to control the vector accuracy.

Next, judgment on the step stage-number, i.e., up to which step the step search is to be performed, can be mentioned. If the movement amount is found to be small, only the first step and fourth step will be performed in the example in FIG. 4. Performing none of the range-extending processings indicated by ② and ③ allows implementation of the higher search speed.

In the step search, at first, the sample range of the candidate vectors at each step is determined from the estimated movement amount. The range becomes wider if the movement amount is large, whereas the range becomes narrower if the movement amount is small. Next, the sample-point number is determined using the image complexity degree. The sample-point number becomes larger if the image complexity degree is high, whereas the sample-point number becomes smaller if the image complexity degree is low. As a result of this, the sample-point spacing becomes the longest if the image complexity degree is low and the movement amount is large. Next, the sample-point spacing becomes basically intermediate, if the image complexity degree is high and the movement amount is large, and if the image complexity degree is low and the movement amount is small. Also, the sample-point spacing becomes the shortest if the image complexity degree is high and the movement amount is small. In this way, by combining both of the estimated movement amount and the image complexity degree, it becomes possible not only to follow the magnitude of the movement, but also to control the search accuracy for the motion vector in response to the image complexity degree.

In association with the above-described control parameters, if, with respect to the image complexity degree and the movement amount, the conditions are contradictory to each other, the conditions are adjusted appropriately. For example, it is desirable that the sample-point spacing for the step search be made narrower to enhance the accuracy if the image is complicated, and that the sample-point spacing be made wider to increase the search speed if the movement amount is large. In this case, in order to maintain the accuracy at a constant value or higher, making the sample-point spacing narrower permits the resultant motion search to be performed in a stable manner. It is also preferable that the sample-point spacing be made wider only when there exists a setting for the speed enhancement in particular. Conversely, if the image complexity degree is low, and if the movement amount is small as well, the adjustment is also executable depending on priority between the accuracy and the speed. In general, however, the sample-point spacing is made narrower thereby to give higher priority to the accuracy. By taking advantage of both of the image complexity degree and the movement amount as the conditions, it becomes possible to make the detailed adjustment of the motion vector search in response to the characteristics of the image.

Although the above-described explanation has been given regarding the case of mainly using the step search, the motion search method according to the present invention is also applicable to searches other than the step search. For example, as a method for allowing the full search to be performed at high speed, there exists quasi-full search where measurements on the error are made in such a manner that the sample points are skipped every other point. In this case, the following method is preferable: The image complexity degree is calculated on each coding-target macro block basis. Then, if the complexity degree is high, the full search is made where all the sample points are to be inspected; whereas, if the complexity degree is low, the quasi-full search is made where the sample points are to be skipped every other point. Regarding the maximum motion search range, it is preferable to change this range in response to the movement amount. Taking advantage of this quasi-full search method results in a larger processing throughput as compared with the case of the step search, but makes it possible to search for the higher-accuracy motion vector. Also, when compared with the use of the completely full-search method, a smaller processing throughput suffices enough.

FIG. 5 illustrates an embodiment of the image coding method according to the present invention. The explanation will be given below regarding features of this embodiment.

At first, at a step (501), the motion search processing in the image coding is started.

At a step (502), the calculation of the luminance variance value is performed. As described earlier, the complexity of an image within a frame to be coded is estimated from an original image. The complexity of the image can be calculated by the variance of the luminance value, the summation of the coefficients acquired after the Hadamard transformation is applied to the image, or the summation of the outputs acquired when the edge filter is applied thereto. The calculation methods are the ones exactly described earlier. Next, the processing proceeds to a step (504).

At a step (503), the calculation of the proximate movement amount is performed. The movement amount of the coding-target block is estimated from the reference-image motion vectors and the coding-image motion vectors. The prediction vector is calculated from the reference-image motion vectors or the coding-image motion vectors, and length of this prediction vector is defined as the movement amount. The calculation method is the one exactly described earlier. Next, the processing proceeds to the step (504).

At the step (504), based on the information acquired from the step (502) and the step (503), the setting and control of the motion search parameters are performed. As the image complexity degree is higher, the search accuracy for the motion vector is enhanced further, i.e., the sample-point spacing in the step search is made narrower. Also, as the movement amount is larger, the motion search range is enlarged further. Namely, the maximum motion search range is extended further, and also the sample-point spacing is made wider. The control method for the parameters is the one exactly described earlier. Next, the processing proceeds to a step (505).

At the step (505), the motion search is performed in accordance with the motion search parameters set at the step (504). As the motion search method, the step search or the full search is used.

The method as explained above makes it possible to adjust the motion search parameters in response to the characteristics of a motion image, such as the complexity and movement magnitude of the image. This adjustment allows selection of the motion vector which has a higher accuracy. As a result, it becomes possible to implement the image coding device which enhances the compression ratio even higher than the existing coding schemes.

Incidentally, in the above-described embodiments, the explanation has been given concerning the image coding device according to the present invention by selecting the specific block size as the example. The application of the present invention, however, is not limited thereto. Namely, the present invention is also applicable to the motion search in various block sizes. Also, the explanation has been given regarding the standards of the coding schemes by mentioning MPEG as the example. The present invention, however, is also applicable to image coding devices which use coding schemes other than MPEG.

While we have shown and described several embodiments in accordance with our invention, it should be understood that disclosed embodiments are susceptible of changes and modifications without departing from the scope of the invention. Therefore, we do not intend to be bound by the details shown and described herein, but intend to cover all such changes and modifications as fall within the ambit of the appended claims.

The invention claimed is:

1. An image coding device, comprising:
 an image complexity-degree estimation unit which calculates complexity degree of an image configuring a motion image,
 a proximate movement-amount estimation unit which estimates movement amount between said image and an image prior or subsequent thereto, and
 a motion prediction unit which performs motion prediction on said image, wherein
 said motion prediction unit exerts control over said motion prediction based on an output from said image complexity-degree estimation unit and an output from said proximate movement-amount estimation unit, and
 wherein, if said movement amount is larger than a predetermined value, said motion prediction unit defines position of a prediction vector as start position of said search, said position of said prediction vector being estimated from a macro block which is adjacent to a processing-target macro block.

2. An image coding device, comprising:
 an image complexity-degree estimation unit which calculates complexity degree of an image configuring a motion image,
 a proximate movement-amount estimation unit which estimates movement amount between said image and an image prior or subsequent thereto, and
 a motion prediction unit which performs motion prediction on said image, wherein
 said motion prediction unit exerts control over said motion prediction based on an output from said image complexity-degree estimation unit and an output from said proximate movement-amount estimation unit, and
 wherein value to be used as said movement amount is any one of a motion vector already determined in a macro block adjacent to a coding-target macro block within said image, a motion vector already determined in a macro block positioned at the same position within said prior image, and movement amount estimated in advance by comparison between said image and said prior image in area unit.

\* \* \* \* \*